United States Patent
Hong et al.

(10) Patent No.: US 8,633,279 B2
(45) Date of Patent: Jan. 21, 2014

(54) METHOD FOR CONTINUOUSLY PRODUCING THERMOPLASTIC RESIN FROM CONJUGATED DIENE AND THERMOPLASTIC RESIN PRODUCED BY THE SAME

(71) Applicant: Cheil Industries Inc., Gumi-si (KR)

(72) Inventors: Jae Keun Hong, Uiwang-si (KR); Sung Hun Kim, Uiwang-si (KR); Dong Keun Yoo, Uiwang-si (KR); Young Kyu Chang, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/711,826

(22) Filed: Dec. 12, 2012

(65) Prior Publication Data

US 2013/0165604 A1  Jun. 27, 2013

(30) Foreign Application Priority Data

Dec. 23, 2011 (KR) .......................... 10-2011-0141790

(51) Int. Cl.
*C08F 279/02* (2006.01)
*C08F 2/04* (2006.01)
*C08F 2/38* (2006.01)
*C08F 4/48* (2006.01)
*C08F 279/04* (2006.01)

(52) U.S. Cl.
USPC ............... 525/316; 525/53; 525/942; 526/65; 526/84; 526/340

(58) Field of Classification Search
USPC ............... 525/53, 316, 942; 526/65, 84, 340
See application file for complete search history.

(56) References Cited

U.S. PATENT DOCUMENTS

| 6,143,833 | A | 11/2000 | Klussmann et al. |
| 6,303,721 | B1 * | 10/2001 | Latsch et al. ................ 526/176 |
| 6,951,901 | B2 | 10/2005 | Gausepohl et al. |
| 2004/0024117 | A1 * | 2/2004 | Bae et al. ........................ 525/53 |

OTHER PUBLICATIONS

Hultin, "A Guide to Solvents and Reagents in Introductory Organic Chemistry . . . ," Feb. 2002, 17 pages.*

* cited by examiner

*Primary Examiner* — Fred M Teskin
(74) *Attorney, Agent, or Firm* — Additon, Higgins, Pendelton & Ashe, P.A.

(57) ABSTRACT

A method for continuously producing a thermoplastic resin from a conjugated diene includes: primarily polymerizing a conjugated diene monomer with an aromatic vinyl monomer in a first solvent in a first reactor, and feeding a hydroxyl group-containing polymerization inhibitor and a polar hydrocarbon to the first reactor to prepare a rubber solution; and adding an aromatic vinyl monomer and a monomer copolymerizable with the aromatic vinyl monomer to the rubber solution, and subjecting the mixture to secondary polymerization in a second solvent of the same kind as the first solvent in a second reactor. The method can provide a thermoplastic resin that can have excellent color and low gloss characteristics.

12 Claims, 1 Drawing Sheet

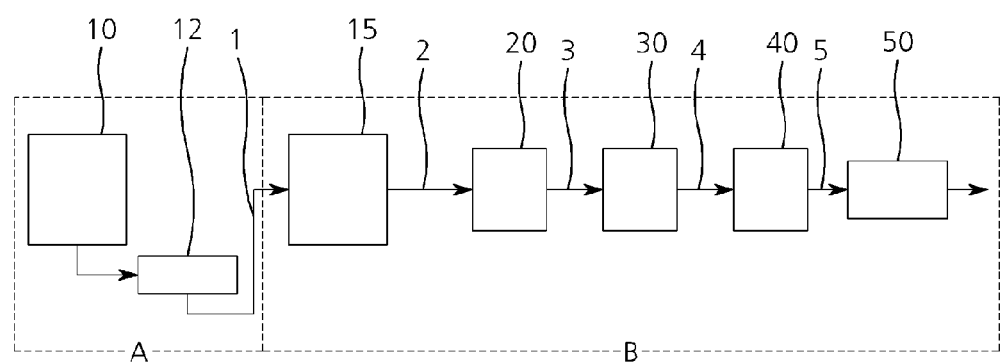

METHOD FOR CONTINUOUSLY PRODUCING THERMOPLASTIC RESIN FROM CONJUGATED DIENE AND THERMOPLASTIC RESIN PRODUCED BY THE SAME

CROSS-REFERENCE TO RELATED APPLICATIONS

This application claims priority under 35 USC Section 119 to and the benefit of Korean Patent Application No. 10-2011-0141790 filed on Dec. 23, 2011, the entire disclosure of which is incorporated herein by reference.

FIELD OF THE INVENTION

The present invention relates to a method for continuously producing a thermoplastic resin from a conjugated diene and a thermoplastic resin produced by the same.

BACKGROUND OF THE INVENTION

Acrylonitrile-butadiene-styrene (ABS) resins are widely used in various applications, for example, automobiles, electrical and electronic devices, office machines, household electric appliances, toys and the like, due to their high impact resistance, good processability, high mechanical strength and attractive appearance.

Generally, processes for producing ABS resins can be broadly classified into the following three groups. The first process is a compounding process in which butadiene as a raw material is emulsion polymerized, styrene and acrylonitrile are added thereto to prepare a graft ABS, and the graft ABS is compounded with a styrene-acrylonitrile (SAN) resin. The second is a bulk suspension process in which butadiene, styrene and acrylonitrile are polymerized to prepare an ABS resin in the form of a bulk polymer and the ABS resin is subjected to suspension polymerization after phase conversion. The third process is a mass/continuous process in which all raw materials are added all together to prepare a final ABS resin at one time.

There are some advantages to the compounding process, such as the use of a relatively small production system. Also, the use of small-sized graft ABS particles produced in batch polymerization can enable the preparation of attractive, high gloss ABS, and the composition of raw materials can be easily changed during compounding to control the physical properties of ABS. However, the final product is produced through many processing steps, which can make it difficult to manage the physical properties of ABS. The addition of additives, such as an emulsifier and a dispersant, during batch polymerization can also cause additional problems.

The bulk-suspension process was mainly employed at the initial stage of ABS development. According to the bulk-suspension process, only one reactor is used for the preparation of an ABS product with relatively stable physical properties. The bulk-suspension process can reduce operation costs and use less energy. However, the bulk-suspension process is very inefficient for large-scale production of ABS. Due to this disadvantage, at present there is only limited investment in ABS mass production equipment for bulk-suspension processing.

The mass/continuous process can allow stable production of large amounts of ABS at one time. The kind of rubbers available for use in mass/continuous processes, however, is limited, and the use of rubbers prepared in other processes can make it difficult to control the inherent physical properties of the rubbers. This in turn can result in many limitations in the production and development of various products.

A conventional ABS production method using the mass/continuous process includes: polymerizing a conjugated diene monomer, stripping the polymerization product to remove solvent and water and preparing the rubber in the form of a bale (first step); pulverizing the rubber bale so as to be suitable for use in a subsequent ABS resin production process and dissolving the rubber pieces in a polymerizable monomer to make a rubber solution (second step); and mixing the rubber solution with a solvent, continuously feeding the mixture into a reactor, polymerizing the mixture, and pelletizing the polymerization product to produce final ABS pellets (third step).

The first step includes the sub-steps of solvent stripping and water removal and preparing a rubber bale. These sub-steps can require a large amount of steam, and thus a large quantity of energy, and can discharge a large amount of wastewater. Another disadvantage is that the rubber pulverization and dissolution can also be energy-consuming. In addition, these steps can increase equipment operation and labor costs.

Thus, there is a need to develop a method for producing a thermoplastic resin by directly adding a rubber solution to a thermoplastic resin polymerization process which can minimize or eliminate the number of post rubber polymerization processes steps, such as forming a rubber bale and pulverizing the rubber.

SUMMARY OF THE INVENTION

The present invention relates to a method for continuously producing a thermoplastic resin from a conjugated diene. In the method, a hydroxyl group-containing polymerization inhibitor and a polar hydrocarbon are used. The method can provide improved color effects, maximized physical properties and high productivity of the final product. Also the method can eliminate the need for a stripping process for solvent removal using steam and water, a water washing process and an aggregation process. Therefore, the method can reduce energy consumption and $CO_2$ emissions and can produce a thermoplastic resin in an environmentally friendly way.

The method includes: primarily polymerizing a conjugated diene monomer with an aromatic vinyl monomer in a first solvent in a first reactor, and feeding a hydroxyl group-containing polymerization inhibitor and a polar hydrocarbon to the first reactor to prepare a rubber solution; and adding an aromatic vinyl monomer and a monomer copolymerizable with the aromatic vinyl monomer to the rubber solution, and subjecting the mixture to secondary polymerization in a second solvent of the same kind as the first solvent in a second reactor.

In exemplary embodiments, the conjugated diene monomer may be butadiene, isoprene or a combination thereof.

In exemplary embodiments, the polymerization in the first reactor may be carried out using an organometallic catalyst.

In exemplary embodiments, a vinyl modifier may be added for the polymerization in the first reactor.

In exemplary embodiments, the rubber solution prepared by the polymerization in the first reactor may be concentrated by extrusion before being fed into the second reactor.

In exemplary embodiments, the first and second solvents may be aromatic solvents.

In exemplary embodiments, the hydroxyl group-containing polymerization inhibitor may be water, low molecular weight monohydric and/or dihydric alcohol such as methanol and/or ethanol, or a combination thereof.

In exemplary embodiments, the polar hydrocarbon may be a hydrophilic organic solvent. Examples of the hydrophilic organic solvent can include without limitation low molecular weight ether-based solvents, ketone-based solvents, sulfoxides, and the like, and combinations thereof.

In exemplary embodiments, the hydroxyl group-containing polymerization inhibitor and the polar hydrocarbon may be present in a weight ratio of about 1:1 to about 1:3.5.

In exemplary embodiments of the method of the present invention, no rubber bale is formed.

The present invention also provides a thermoplastic resin produced by the method. The thermoplastic resin can have a yellow index (YI) of about 5 or less, as measured in accordance with ASTM E313, and a ⅛" notched impact strength of about 10 to about 60 kgf·cm/cm, as measured in accordance with ASTM D256.

BRIEF DESCRIPTION OF THE DRAWINGS

The drawing schematically illustrates a polymerization system for continuously producing a thermoplastic resin from a conjugated diene according to an embodiment of the present invention.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The method for continuously producing a thermoplastic resin from a conjugated diene includes: primarily polymerizing a conjugated diene monomer with an aromatic vinyl monomer in a first solvent in a first reactor, and feeding a hydroxyl group-containing polymerization inhibitor and a polar hydrocarbon to the first reactor to prepare a rubber solution; and adding an aromatic vinyl monomer and a monomer copolymerizable with the aromatic vinyl monomer to the rubber solution, and subjecting the mixture to secondary polymerization in a second solvent of the same kind as the first solvent in a second reactor.

Rubber Polymerization

Examples of the conjugated diene monomer may include without limitation butadiene, isoprene and the like, and combinations thereof.

Examples of the aromatic vinyl monomer may include without limitation styrene, α-methylstyrene, α-ethylstyrene, p-methylstyrene, and the like, and combinations thereof. Styrene can be used in exemplary embodiments.

The rubber solution may be prepared by solution polymerization of the conjugated diene monomer in the first solvent. There is no restriction as to the kind of the first solvent. For example, the first solvent may be any solvent commonly used in the art that is capable of effectively controlling reaction heat emitted during polymerization. Examples of the first solvent include without limitation aromatic solvents, such as ethylbenzene, benzene, xylene and toluene, methyl ethyl ketone, and the like, and combinations thereof. These solvents are readily available and can also be used in the subsequent thermoplastic resin polymerization process.

The conjugated diene monomer fed to the first reactor where the rubber solution is prepared may be used in an amount of about 10% to about 50% by weight, for example about 20% to about 40% by weight, based on the total weight of conjugated diene monomer, aromatic vinyl monomer and first solvent. In some embodiments, the conjugated diene monomer can be used in an amount of about 10, 11, 12, 13, 14, 15, 16, 17, 18, 19, 20, 21, 22, 23, 24, 25, 26, 27, 28, 30, 31, 32, 33, 34, 35, 36, 37, 38, 39, 40, 41, 42, 43, 44, 45, 46, 47, 48, 49, or 50% by weight. Further, according to some embodiments of the present invention, the amount of conjugated diene monomer can be in a range from about any of the foregoing amounts to about any other of the foregoing amounts.

The aromatic vinyl monomer fed to the first reactor where the rubber solution is prepared may be used in an amount of about 0% to about 25% by weight, for example about 10% to about 20% by weight, based on the total weight of conjugated diene monomer, aromatic vinyl monomer and first solvent. In some embodiments, the aromatic vinyl monomer can be used in an amount of 0% by weight (no aromatic vinyl monomer is present), about 0 (aromatic vinyl monomer is present), 1, 2, 3, 4, 5, 6, 7, 8, 9, 10, 11, 12, 13, 14, 15, 16, 17, 18, 19, 20, 21, 22, 23, 24, or 25% by weight. Further, according to some embodiments of the present invention, the amount of aromatic vinyl monomer can be in a range from about any of the foregoing amounts to about any other of the foregoing amounts.

The first solvent fed to the first reactor where the rubber solution is prepared may be used in an amount of about 50% to about 90% by weight, for example about 55% to about 70% by weight, based on the total weight of conjugated diene monomer, aromatic vinyl monomer and first solvent. In some embodiments, the first solvent fed to the first reactor can be used in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of the first solvent used in the first reactor can be in a range from about any of the foregoing amounts to about any other of the foregoing amounts.

When the conjugated diene monomer, aromatic vinyl monomer, and first solvent are used in amounts within the above ranges, the primary polymerization can be stably carried out.

In one embodiment, the polymerization in the first reactor may be carried out using an organometallic catalyst. The organometallic catalyst can be selected from metal catalyst systems capable of living polymerization of diene monomers. A lithium catalyst capable of controlling the cis-trans-vinyl content of the polymer can be used. Examples of such lithium catalysts include without limitation methyl lithium, ethyl lithium, n-butyl lithium, sec-butyl lithium, isopropyl lithium, cyclohexyl lithium phenyl lithium, n-butyl lithium sec-butyl lithium, and the like. These lithium catalysts may be used alone or as a mixture of two or more thereof.

In one embodiment, the catalyst may be added in an amount of about 0.005 to about 1.0 part by weight, for example about 0.01 to about 0.8 parts by weight, based on about 100 parts by weight of the monomer mixture (that is, the weight of the mixture of the conjugated diene monomer and the aromatic vinyl monomer). In some embodiments, the catalyst can be used in an amount of about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1.0 parts by weight. Further, according to some embodiments of the present invention, the amount of the catalyst can be in a range from about any of the foregoing amounts to about any other of the foregoing amounts.

When the catalyst is used in an amount within this range, the rubber polymerization reaction can be stably conducted, and the thermoplastic resin can have excellent low gloss characteristics, high impact strength and good discoloration resistance.

In one embodiment, the polymerization inhibitor may be fed into the first reactor when the post-polymerization conversion reaches about at least 95%, for example about 100%. The polymerization inhibitor can be one that contains at least one hydroxyl group, can effectively stop the activity of leaving lithium ions and can minimally affect the subsequent thermoplastic resin polymerization process.

Examples of the hydroxyl group-containing polymerization inhibitor may include without limitation water, alcohols, and the like, and combinations thereof. In one embodiment, the hydroxyl group-containing polymerization inhibitor can be selected from water, low molecular weight monohydric and/or dihydric alcohols such as methanol, ethanol, and the like, and combinations thereof. As used herein, the term "low molecular weight monohydric and/or dihydric alcohols" refers to monohydric and/or dihydric alcohols having 1 to 5 carbon atom. Water can be cost effective. These hydroxyl group-containing polymerization inhibitors may be used alone or as a mixture of two or more thereof.

The hydroxyl group-containing polymerization inhibitor is typically used in an amount of about 0.005 to about 2.0 parts by weight, for example about 0.01 to about 1.0 part by weight, based on about 100 parts by weight of the monomer mixture (that is, the weight of the mixture of the conjugated diene monomer and the aromatic vinyl monomer). In some embodiments, the hydroxyl group-containing polymerization inhibitor can be used in an amount of about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 parts by weight. Further, according to some embodiments of the present invention, the amount of the hydroxyl group-containing polymerization inhibitor can be in a range from about any of the foregoing amounts to about any other of the foregoing amounts.

The polymerization inhibitor having at least one hydroxyl group is not readily miscible with the polymer solution. For the purpose of increasing the miscibility of the polymerization inhibitor, the polar hydrocarbon can be used together with the polymerization inhibitor. The polar hydrocarbon may be a hydrophilic organic solvent. Examples of hydrophilic organic solvents include without limitation low molecular weight ether-based solvents, ketone-based solvents, sulfoxides, and the like, and combinations thereof. As used in reference to the polar hydrocarbon, the term "low molecular weight" refers to polar hydrocarbons having 1 to 5 carbon atom. Examples of such hydrophilic organic solvents include without limitation tetrahydrofuran (THF), dimethyl ether, acetone, and dimethyl sulfoxide. These hydrophilic organic solvents may be used alone or as a mixture of two or more thereof.

The polar hydrocarbon is typically used in an amount of about 0.005 to about 4.0 parts by weight, for example about 0.01% to about 2.0% by weight, based on about 100 parts by weight of the monomer mixture (that is, the weight of the mixture of the conjugated diene monomer and the aromatic vinyl monomer). In some embodiments, the polar hydrocarbon can be used in an amount of about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9. 3.0, 3.1, 3.2, 3.3, 3.4, 3.5, 3.6, 3.7, 3.8, 3.9, or 4.0% by weight. Further, according to some embodiments of the present invention, the amount of the polar hydrocarbon can be in a range from about any of the foregoing amounts to about any other of the foregoing amounts.

In one embodiment, a vinyl modifier may be fed into the first reactor. The vinyl modifier can be selected from organic molecules capable of complexing with the metal catalyst to modify the molecular structure of the final product. An exemplary vinyl modifier includes a diamine compound that is highly reactive with the lithium catalyst.

The vinyl modifier is typically used in an amount of about 0.0001 to about 0.01 parts by weight, for example about 0.001 to about 0.008 parts by weight, based on about 100 parts by weight of the monomer mixture (that is, the weight of the mixture of the conjugated diene monomer and the aromatic vinyl monomer). In some embodiments, the vinyl modifier can be used in an amount of about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, or 0.01 parts by weight. Further, according to some embodiments of the present invention, the amount of the vinyl modifier can be in a range from about any of the foregoing amounts to about any other of the foregoing amounts.

When the vinyl modifier is used in an amount within this range, the graft ratio of the final product can be maintained to achieve desired physical properties and the polymerization reaction can be normally carried out without deteriorating the reactivity of the metal catalyst.

The polymerization in the first reactor may be carried out at a temperature of about 30° C. to about 100° C. for about 40 to about 150 minutes.

At least one additive such as an antioxidant may be fed into the first reactor when the post-polymerization conversion reaches about at least 95%, for example about 100%.

The antioxidant may be a hindered phenolic antioxidant. Examples of the hindered phenolic antioxidant may include octadyl 3-(4-hydroxy-3,5-di-tert-butylphenyl)propionate but is not necessarily limited thereto. A mixture of two or more hindered phenolic antioxidants may be used.

The antioxidant may be added in an amount of about 0.2 to about 0.8 parts by weight, based on about 100 parts by weight of the monomer mixture (that is, the weight of the mixture of the conjugated diene monomer and the aromatic vinyl monomer). In some embodiments, the antioxidant can be used in an amount of about 0.2, 0.3, 0.4, 0.5, 0.6, 0.7 or 0.8 parts by weight. Further, according to some embodiments of the present invention, the amount of the antioxidant can be in a range from about any of the foregoing amounts to about any other of the foregoing amounts.

In the rubber solution, the rubber is dissolved in the first solvent. A portion of the first solvent can be removed from the rubber solution, for example using a twin-screw extruder, before the subsequent process step.

Unlike the prior art, the method of the present invention uses the same kind of solvents in the rubber polymerization process and the subsequent thermoplastic resin polymerization. In the method of the present invention, only a portion of the solvent used in the rubber polymerization process is removed and the remaining portion thereof is used without further removal in the subsequent process. Therefore, there is no need for post processing to completely remove the solvent before the subsequent process, which is advantageous in terms of efficiency and energy savings.

For example, a twin-screw extruder, from which the first solvent used in the rubber polymerization process can be removed, can have four vent zones having dimensions of 30Φ and L/D 45. The solvent can be removed in the vent zones with pressures adjusted to about 10 torr to ambient pressure.

The first solvent can be removed in an amount sufficient to adjust the concentration of the rubber component in the rubber solution to about 10% to about 70% by weight. In some embodiments, the first solvent can be removed in an amount sufficient to adjust the concentration of the rubber component in the rubber solution to about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 40, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the first solvent removed can be an amount sufficient to adjust the concentration of the rubber component in the rubber solution in a range from about any of the foregoing amounts to about any other of the foregoing amounts.

When the concentration of the rubber component is within the above range, the solvent can be removed and transferred in a stable manner.

Thermoplastic Resin Polymerization From the Rubber

The aromatic vinyl monomer and the monomer copolymerizable with the aromatic vinyl monomer are added to the rubber solution, from which a portion of the first solvent is already removed.

Examples of the aromatic vinyl monomer may include without limitation styrene, α-methylstyrene, α-ethylstyrene, p-methylstyrene, and the like, and combinations thereof. Styrene can be used in exemplary embodiments.

Examples of the copolymerizable monomer include without limitation cyanide vinyl monomers, (meth)acrylate monomers, unsaturated carboxylic acids or anhydrides thereof, and the like, and combinations thereof.

The thermoplastic resin may be prepared by a suitable polymerization process, for example, bulk polymerization, solution polymerization or bulk-suspension polymerization. Solution polymerization can be used in exemplary embodiments.

In one embodiment, the aromatic vinyl monomer and the copolymerizable monomer, together with the second solvent, are added to the rubber solution from which a portion of the first solvent is already removed. When the aromatic vinyl monomer and the second solvent are added together, the amount of the rubber component is adjusted to about 6% to about 15% by weight. For example, the aromatic vinyl monomer, the rubber component, the copolymerizable monomer and the second solvent can be used in amounts of about 40% to about 70% by weight, about 6% to about 15% by weight, about 5% to about 25% by weight and about 2% to about 20% by weight, respectively.

In some embodiments, the aromatic vinyl monomer can be used in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the aromatic vinyl monomer can be in a range from about any of the foregoing amounts to about any other of the foregoing amounts.

In some embodiments, the rubber component can be used in an amount of about 6, 7, 8, 9, 10, 11, 12, 13, 14, or 15% by weight. Further, according to some embodiments of the present invention, the amount of the rubber component can be in a range from about any of the foregoing amounts to about any other of the foregoing amounts.

In some embodiments, the copolymerizable monomer can be used in an amount of about 5, 6, 7, 8, 9, 10, 11, 12, 13, 14, 15, 16, 17, 18, 19, 20, 21, 22, 23, 24, or 25% by weight. Further, according to some embodiments of the present invention, the amount of the copolymerizable monomer can be in a range from about any of the foregoing amounts to about any other of the foregoing amounts.

In some embodiments, the second solvent can be used in an amount of about 2, 3, 4, 5, 6, 7, 8, 9, 10, 11, 12, 13, 14, 15, 16, 17, 18, 19, or 20% by weight. Further, according to some embodiments of the present invention, the amount of the second solvent can be in a range from about any of the foregoing amounts to about any other of the foregoing amounts.

When the amounts of the aromatic vinyl monomer, the rubber component, the copolymerizable monomer and the second solvent are within the above ranges, the thermoplastic resin can have excellent low gloss characteristics, high impact strength, and good fluidity.

The second solvent may be of the same kind as the first solvent. That is, the second solvent may be, for example, an aromatic solvent such as ethylbenzene, benzene, xylene, toluene, methyl ethyl ketone, and the like, and combinations thereof, but is not necessarily limited thereto.

In the second reactor, the polymerization may be continued until the polymer solution undergoes a phase transition to obtain a solid content of about 20 to about 30%.

The drawing schematically illustrates a polymerization system for continuously producing a thermoplastic resin from a conjugated diene according to an embodiment of the present invention. In FIG. 1, the rubber polymerization process is carried out in Stage A and the thermoplastic resin polymerization process is carried out in Stage B.

As illustrated in the drawing, the conjugated diene monomer, the aromatic vinyl monomer and the first solvent are fed into a first reactor 10 where polymerization occurs.

The first reactor 10 can be equipped with a double-helical-ribbon type agitator. In the first reactor, the polymerization can be carried out at a temperature of about 30° C. to about 100° C. for a time of about 40 to about 150 minutes.

The polymerization inhibitor and the polar hydrocarbon can be added when the polymerization conversion reaches about at least 95%, for example about 100%. Then, the resulting mixture can be transferred to a twin-screw extruder 12 where a portion of the solvent is removed. The rubber solution, from which a portion of the solvent is already removed, can be transferred from the twin-screw extruder 12 to a storage bath 15 through a line 1. The rubber solution passing through the line can include about 30% to about 90% by weight of the solvent and about 10% to about 70% by weight of the rubber component.

In some embodiments, the rubber solution passing through the line can include solvent in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments of the present invention, the amount of solvent can be in a range from about any of the foregoing amounts to about any other of the foregoing amounts.

In some embodiments, the rubber solution passing through the line can include the rubber component in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the rubber component can be in a range from about any of the foregoing amounts to about any other of the foregoing amounts.

The aromatic vinyl monomer, the copolymerizable monomer, and the second solvent can be fed into the storage bath 15 to dissolve the rubber solution. The rubber solution can be continuously fed into a second reactor 20 through a line 2. In the second reactor, a thermoplastic resin can be polymerized. The rubber solution passing through the line 2 can be dissolved in the aromatic vinyl monomer, the copolymerizable monomer and the second solvent. The rubber solution in the second reactor can include about 40% to about 70% by weight of the aromatic vinyl monomer, about 6% to about 15% by weight of the rubber component, about 5% to about 25% by weight of the copolymerizable monomer, and about 2 to about 20% by weight of the second solvent.

In some embodiments, the rubber solution in the second reactor can include the aromatic vinyl monomer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of the aromatic vinyl monomer can be in a range from about any of the foregoing amounts to about any other of the foregoing amounts.

In some embodiments, the rubber solution in the second reactor can include the rubber component in an amount of about 6, 7, 8, 9, 10, 11, 12, 13, 14, or 15% by weight. Further, according to some embodiments of the present invention, the amount of the rubber component can be in a range from about any of the foregoing amounts to about any other of the foregoing amounts.

In some embodiments, the rubber solution in the second reactor can include the copolymerizable monomer in an amount of about 5, 6, 7, 8, 9, 10, 11, 12, 13, 14, 15, 16, 17, 18, 19, 20, 21, 22, 23, 24, or 25% by weight. Further, according to some embodiments of the present invention, the amount of the copolymerizable monomer can be in a range from about any of the foregoing amounts to about any other of the foregoing amounts.

In some embodiments, the rubber solution in the second reactor can include the second solvent in an amount of about 2, 3, 4, 5, 6, 7, 8, 9, 10, 11, 12, 13, 14, 15, 16, 17, 18, 19, or 20% by weight. Further, according to some embodiments of the present invention, the amount of the second solvent can be in a range from about any of the foregoing amounts to about any other of the foregoing amounts.

The rubber solution can be allowed to react in the second reactor 20 at a temperature of about 100° C. to about 135° C. for about 0.5 to about 1.5 hours until it undergoes a phase transition to prepare a first polymerization mixture having a solid content of about 10% to about 30%. A continuous stirred tank reactor (CSTR) is suitably used as the second reactor 20. The second reactor 20 can be a full charge type in which the polymerization mixture is supplied to the bottom and is released from the top after reaction.

The first polymerization mixture can be continuously fed into a third reactor 30 through a line 3. In the third reactor 30, the first polymerization mixture can be polymerized at a temperature of about 110° C. to about 145° C. for about 1.5 to about 3.0 hours to prepare a second polymerization mixture having a solid content of about 30% to about 50%. In one embodiment, a continuous stirred tank reactor (CSTR) may be used as the third reactor 30. In one embodiment, the continuous stirred tank reactor (CSTR) may be equipped with an agitating apparatus in the form of an anchor.

The second polymerization mixture can be continuously fed into a fourth reactor 40 through a line 4. In the fourth reactor 40, the second polymerization mixture can be allowed to react at a temperature of about 120° C. to about 155° C. for about 1.5 to about 3.0 hours to prepare a third polymerization mixture having a solid content of about 60% to about 90%. The fourth reactor 40 may also be equipped with a double-helical-ribbon type agitator.

The third polymerization mixture can be fed into a devolatilization bath 50 through a line 5 where unreacted monomers and solvents can be removed. Thereafter, the third polymerization mixture can be produced into pellets using suitable devices, such as a pelletizer.

According to the method of the present invention, the rubber production process is introduced upstream the thermoplastic resin polymerization process, thus eliminating the need for a stripping process for solvent removal using steam and water, a water washing process and an aggregation process. In addition, the method of the present invention does not involve a rubber bale production process and a pulverization process. Therefore, according to the method of the present invention, a thermoplastic resin can be produced in an environmentally friendly way.

The thermoplastic resin produced by the method of the present invention can have a yellow index (YI) of about 5 or less, as measured in accordance with ASTM E313, and a 1/8" notched impact strength of about 10 to about 60 kgf·cm/cm, as measured in accordance with ASTM D256.

Next, the constitutions and effects of the present invention will be explained in more detail with reference to examples. However, it should be understood that these examples are provided for illustration only and are not to be construed in any way as limiting the present invention.

A description of details apparent to those skilled in the art will be omitted herein.

EXAMPLES

Example 1

After 18.5 wt % of a butadiene monomer, 6.5 wt % of styrene and 75 wt % of toluene are fed into a first reactor, n-butyl lithium (NBL) as a metal catalyst and t-methylethyl-enediamine (TMEDA) as a vinyl modifier are added thereto. The metal catalyst and the vinyl modifier are used in amounts of 0.12 parts by weight and 0.004 parts by weight, respectively, based on 100 parts by weight of the mixture of the butadiene monomer and the styrene monomer. The mixture is polymerized at 50° C. for 60 min. After the conversion of the polymerization mixture is confirmed to reach 100%, water as a polymerization inhibitor and THF are added to quench the polymerization. The polymerization inhibitor and the THF are used in amounts of 0.12 parts by weight and 0.24 parts by weight, based on 100 parts by weight of the mixture of the butadiene monomer and the styrene monomer. Thereafter, the toluene is removed from the rubber solution using a twin-screw extruder until the content of the rubber component reached 50 wt %.

After the rubber polymerization reaction, the rubber solution dissolved in the aromatic monomer is transferred to a storage bath. 54 wt % of a styrene monomer as a reactant, 18 wt % of acrylonitrile as a reactant and 20 wt % of ethylbenzene as a solvent are added to 8 wt % of the rubber in the storage bath. The rubber solution is continuously fed into a second reactor connected to a third reactor and a fourth reactor in series. The rubber solution is allowed to react in the second reactor until it undergoes a phase transition to prepare a first polymerization mixture having a solid content of 25%. The first polymerization mixture is continuously fed into the third reactor and allowed to react there to prepare a second polymerization mixture having a solid content of 45%. Thereafter, the second polymerization mixture is continuously fed into a fourth reactor and allowed to react there to prepare a third polymerization mixture having a solid content of 63%. Unreacted reactants are separated from the final polymerization mixture in a devolatilization bath under vacuum at a high temperature. The final product is produced into pellets using a pelletizer.

The pellets are dried at 80° C. for 3 hr and injection molded in a 6 oz injection molding machine at a molding temperature of 180-280° C. and a die temperature of 40-80° C. to produce specimens.

Examples 2-5

The procedure of Example 1 is repeated except that the amounts of the components fed into the first reactor are changed as shown in Table 1.

TABLE 1

| | | | Example No. | | | | |
|---|---|---|---|---|---|---|---|
| | | | 1 | 2 | 3 | 4 | 5 |
| First reactor [Rubber polymerization reactor] (wt %) | Butadiene | wt % | 18.5 | 18.5 | 18.5 | 18.5 | 18.5 |
| | Styrene | | 6.5 | 6.5 | 6.5 | 6.5 | 6.5 |
| | Toluene | | 75 | 75 | 75 | 75 | 75 |
| | Organometallic catalyst | Parts by weight relative to 100 parts by weight of the monomer mixture | 0.03 | 0.03 | 0.03 | 0.03 | 0.03 |
| | Vinyl group modifier | | 0.004 | 0.004 | 0.004 | 0.004 | 0.004 |
| | Water | | 0.12 | 0.15 | 0.20 | 0.24 | 0.30 |
| | THF | | 0.24 | 0.30 | 0.45 | 0.48 | 0.18 |
| Second reactor | Solid content (%) | | | | 25 | | |
| | Reaction temperature (° C.) | | 112 | 112 | 112 | 111 | 112 |
| | Retention time (hr) | | | | 1 | | |
| Third reactor | Solid content (%) | | | | 45 | | |
| | Reaction temperature (° C.) | | 126 | 125 | 126 | 125 | 126 |
| | Retention time (hr) | | | | 2 | | |
| Fourth reactor | Solid content (%) | | | | 63 | | |
| | Reaction temperature (° C.) | | 135 | 135 | 135 | 135 | 135 |
| | Retention time (hr) | | | | 2 | | |
| Physical properties | YI | | 3.1 | 4.2 | 3.6 | 3.4 | 4.0 |
| | Silver | | X | X | X | X | X |
| | Gloss | | 56 | 52 | 40 | 53 | 55 |
| | rps (μm) | | 0.84 | 0.99 | 0.16 | 0.90 | 0.96 |
| | Impact strength | | 22 | 21 | 20 | 23 | 22 |
| | Fluidity | | 22 | 23 | 27 | 22 | 24 |

Comparative Examples 1-3

The procedure of Example 1 is repeated except that the amounts of n-butyl lithium as a catalyst, water as a polymerization inhibitor and THF fed into the first reactor are changed as shown in Table 2.

TABLE 2

| | | | Comparative Example No. | | |
|---|---|---|---|---|---|
| | | | 1 | 2 | 3 |
| First reactor [Rubber polymerization reactor] (wt %) | Butadiene | wt % | 18.5 | 18.5 | 18.5 |
| | Styrene | | 6.5 | 6.5 | 6.5 |
| | Toluene | | 75 | 75 | 75 |
| | Organometallic catalyst | Parts by weight relative to 100 parts by weight of the monomer mixture | 0.03 | 0.03 | 0.03 |
| | Vinyl group modifier | | 0.004 | 0.004 | 0.004 |
| | Water | | — | 0.12 | — |
| | THF | | — | — | 0.12 |
| Second reactor | Solid content (%) | | | 25 | |
| | Reaction temperature (° C.) | | 118 | 113 | 112 |
| | Retention time (hr) | | | 1 | |
| Third reactor | Solid content (%) | | | 45 | |
| | Reaction temperature (° C.) | | 125 | 125 | 125 |
| | Retention time (hr) | | | 2 | |
| Fourth reactor | Solid content (%) | | | 63 | |
| | Reaction temperature (° C.) | | 135 | 130 | 135 |
| | Retention time (hr) | | | 2 | |
| Physical properties | YI | | 12.9 | 7.7 | 11.8 |
| | Silver | | X | X | X |
| | Gloss | | 54 | 56 | 56 |

TABLE 2-continued

|  | Comparative Example No. | | |
| --- | --- | --- | --- |
|  | 1 | 2 | 3 |
| rps (μm) | 0.82 | 0.88 | 0.86 |
| Impact strength | 21 | 24 | 20 |
| Fluidity | 23 | 21 | 22 |

The resin characteristics of the final polymerization products and the physical properties of the injection-molded products are analyzed by the following methods.

(1) Yellow Index (YI) is measured using a spectrophotometer (CM-3600d) according to ASTM E313.

(2) Silver is evaluated by visual observation whether the surfaces of the injection-molded specimens are contaminated with moisture or gas.

(3) 75° gloss (G.U) is measured using a BYK-Gardner gloss meter.

(4) Rubber particle size (rps, μm) is measured using Mastersizer S Ver 2.14 (Malvern).

(5) Izod impact strength (kgf·cm/cm) is measured under ⅛" notched conditions according to ASTM D256.

(6) Fluidity (g/10 min) is measured under 220° C./10 kg conditions according to ASTM D1238.

As can be seen from the results in Tables 1 and 2, the resins produced in Examples 1-5 have high impact strengths and fluidities and have excellent low gloss characteristics, which imply improved color characteristics. In contrast, the resins produced in Comparative Examples 1-3, which did not use hydroxyl-group containing polymerization inhibitor and/or polar hydrocarbon, have high yellow indices.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A method for continuously producing a thermoplastic resin from a conjugated diene, the method comprising:
   primarily polymerizing a conjugated diene monomer with an aromatic vinyl monomer in a first solvent in a first reactor, and feeding a hydroxyl group-containing polymerization inhibitor and a polar hydrocarbon to the first reactor to prepare a rubber solution; and
   adding an aromatic vinyl monomer and a monomer copolymerizable with the aromatic vinyl monomer to the rubber solution, and subjecting the mixture to secondary polymerization in a second solvent of the same kind as the first solvent in a second reactor,
   wherein the polar hydrocarbon is a hydrophilic organic solvent comprising low molecular weight ether-based solvent, ketone-based solvent, sulfoxide, or a combination thereof.

2. The method as claimed in claim 1, wherein the conjugated diene monomer is butadiene, isoprene or a combination thereof.

3. The method as claimed in claim 1, wherein the polymerization in the first reactor is carried out using an organometallic catalyst.

4. The method as claimed in claim 1, wherein a vinyl modifier is added for the polymerization in the first reactor.

5. The method as claimed in claim 1, wherein the rubber solution prepared by the polymerization in the first reactor is concentrated by extrusion before being fed into the second reactor.

6. The method as claimed in claim 1, wherein the first and second solvents are aromatic solvents.

7. The method as claimed in claim 1, wherein the hydroxyl group-containing polymerization inhibitor comprises water, low molecular weight monohydric alcohol, low molecular weight dihydric alcohol, or a combination thereof.

8. The method as claimed in claim 1, wherein the hydroxyl group-containing polymerization inhibitor and the polar hydrocarbon are in a weight ratio of about 1:1 to about 1:3.5.

9. The method as claimed in claim 1, wherein no rubber bale is formed.

10. A thermoplastic resin which is produced by the method of claim 1, having a yellow index (YI) of about 5 or less, as measured in accordance with ASTM E313, and a ⅛" notched impact strength of about 10 to about 60 kgf·cm/cm, as measured in accordance with ASTM D256.

11. A method for continuously producing a thermoplastic resin from a conjugated diene, the method comprising:
   primarily polymerizing a conjugated diene monomer with an aromatic vinyl monomer in a first solvent in a first reactor, and feeding a hydroxyl group-containing polymerization inhibitor and a polar hydrocarbon to the first reactor to prepare a rubber solution; and
   adding an aromatic vinyl monomer and a monomer copolymerizable with the aromatic vinyl monomer to the rubber solution, and subjecting the mixture to secondary polymerization in a second solvent of the same kind as the first solvent in a second reactor,
   wherein a vinyl modifier is added for the polymerization in the first reactor.

12. A method for continuously producing a thermoplastic resin from a conjugated diene, the method comprising:
   primarily polymerizing a conjugated diene monomer with an aromatic vinyl monomer in a first solvent in a first reactor, and feeding a hydroxyl group-containing polymerization inhibitor and a polar hydrocarbon to the first reactor to prepare a rubber solution; and
   adding an aromatic vinyl monomer and a monomer copolymerizable with the aromatic vinyl monomer to the rubber solution, and subjecting the mixture to secondary polymerization in a second solvent of the same kind as the first solvent in a second reactor,
   wherein the rubber solution prepared by the polymerization in the first reactor is concentrated by extrusion before being fed into the second reactor.

* * * * *